UNITED STATES PATENT OFFICE.

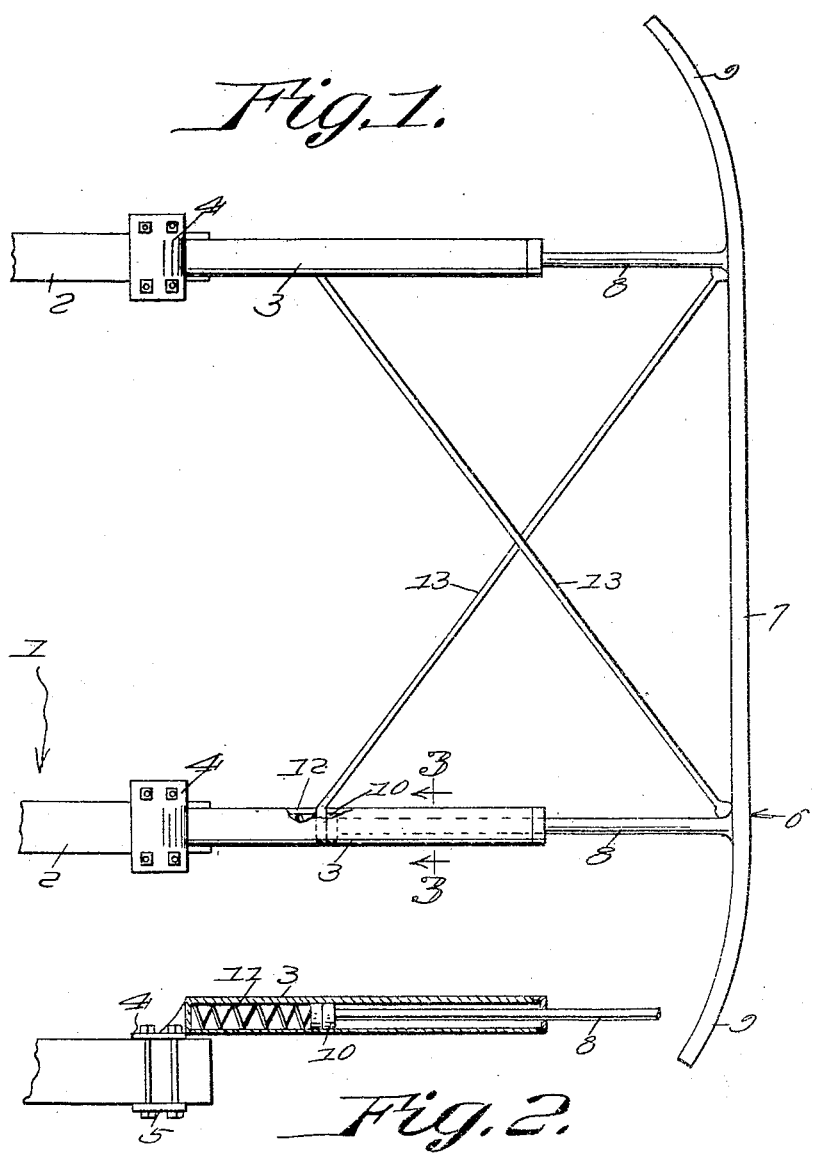

THOMAS L. ROBERTSON, OF SPRAY, NORTH CAROLINA.

AUTO-BUMPER.

1,348,053.  Specification of Letters Patent.  Patented July 27, 1920.

Application filed November 19, 1918. Serial No. 263,207.

*To all whom it may concern:*

Be it known that I, THOMAS L. ROBERTSON, a citizen of the United States of America, residing at Spray, in the county of Rockingham and State of North Carolina, have invented new and useful Improvements in Auto-Bumpers, of which the following is a specification.

The purpose of the invention is to provide a bumper of the character mentioned in which the shock of an impact imparted to it is received by springs positioned one on either side of the vehicle and the peculiar construction of the bumper results in both springs taking care of any shock, irrespective at what point on the bumper the impact occurs.

A further purpose of the invention is to provide an automobile bumper which is simple in construction, durable and effective in operation and inexpensive to manufacture.

Other and further purposes will appear in the following description wherein the invention is set forth in detail.

To the exact construction in which it is shown and described the invention is not to be restricted. The right is reserved to make such changes or alterations as the actual reduction to practice may suggest, in so far as such changes or alterations are compatible in spirit with the annexed claim.

In the accompanying drawings:

Figure 1 is a top plan view of one end of an auto vehicle running gear showing the invention attached thereto.

Fig. 2 is a vertical sectional view through the improved bumper.

Fig. 3 is a section on the line 3—3 of Fig. 1.

As shown, there is illustrated the forward end of the running gear 1 of an auto vehicular apparatus, which running gear is provided with the usual side rails 2 to each of which there is clamped a tubular housing 3, the latter being provided with a foot 4 comprising one clamping element with which the clamping element 5 co-acts to secure the housing 3 to the rail 2. The bumper 6 is mounted in the housings 3 and is designed for fore and aft movement with reference to the housings. It comprises the transverse bar 7 to which there are secured the legs 8, the end portions 9 of the bar being bent rearwardly as is usual in bumper construction.

The ends of the housings 3 are closed but are provided with suitable openings arranged so that the legs 8 may enter these ends, the legs slidably engaging in the housings and carrying collars 10 which are interior to the housings.

Surrounding the legs 8, but contained within the housings between the inner ends of which and the collars 10 they are compressed, there are the spiral springs 11, these tending normally to keep the collars 10 forced toward the outer ends of the housings and thereby keep the bumper extended to its farthermost position.

The housings 3 on their facing sides are provided with the longitudinal slots 12 through each of which a diagonally disposed brace rod 13 passes, one end of the rod being attached to the spring 11 of one housing and the other end being secured—by welding or any other suitable means of attachment—to the bumper 6 adjacent the point of juncture of the bar 7 and the leg 8 which enters the opposite housing.

This construction provides for the adequate distribution to both the springs 11 of any shock imparted to the bumper 6. If the impact of the shock is closer to one of the legs 8 than to the other, the spring 11 sustains the former leg which would ordinarily receive the greater part of the shock, but the provision of the diagonally disposed brace rods 13 serves to transmit a part of the force of the impact to the opposite spring 11, so that both springs act substantially to bear the shock of the impact equally.

From the foregoing description and accompanying drawing, it is believed that a clear enough understanding of the invention will be had to render further description unnecessary.

The invention having been described, what is claimed as new and useful is:

In a vehicle bumper, a pair of housings having means for attachment to the frame of a vehicle, a bumper formed with legs slidingly engaging said housings, springs within the housings and bearing upon the legs to force them and the bumper normally outward, the housings being formed with slots on their facing sides, and diagonally disposed brace bars each connecting with the spring in one housing and with the bumper at a point directly in front of the opposite housing, whereby a shock imparted to the bumper is borne by both springs irrespective of the point of impact of said shock with the bumper.

In testimony whereof I affix my signature.

THOMAS L. ROBERTSON.